US012796619B2

(12) United States Patent
Missotten et al.

(10) Patent No.: US 12,796,619 B2
(45) Date of Patent: Nov. 17, 2026

(54) RETURN PAN CONTROL IN A COMBINE HARVESTER

(71) Applicant: CNH Industrial Belgium N.V., Zedelgem (BE)

(72) Inventors: Bart M.A. Missotten, Herent (BE); Dré W.J. Jongmans, Klundert (BE); Sam Reubens, Sint-Michiels (BE); Pieter Van Overschelde, Sint-Andries (BE); Bertl Verschaeve, Gits (BE); Frederik Tallir, Esen (BE)

(73) Assignee: CNH Industrial Belgium N.V., Zedelgem (BE)

( * ) Notice: Subject to any disclaimer, the term of this patent is extended or adjusted under 35 U.S.C. 154(b) by 315 days.

(21) Appl. No.: 18/593,220

(22) Filed: Mar. 1, 2024

(65) Prior Publication Data

US 2024/0292788 A1 Sep. 5, 2024

(30) Foreign Application Priority Data

Mar. 2, 2023 (EP) .................................... 23159657

(51) Int. Cl.

| | |
|---|---|
| ***A01F 12/44*** | (2006.01) |
| ***A01D 41/127*** | (2006.01) |
| ***A01F 12/18*** | (2006.01) |

(52) U.S. Cl.

CPC ........ *A01F 12/448* (2013.01); *A01D 41/1271* (2013.01); *A01D 41/1273* (2013.01); *A01F 12/184* (2013.01); *A01F 12/446* (2013.01)

(58) Field of Classification Search

CPC .... A01F 12/184; A01F 12/446; A01F 12/448; A01D 41/1271; A01D 41/1273

See application file for complete search history.

(56) References Cited

U.S. PATENT DOCUMENTS

| | | | | |
|---|---|---|---|---|
| 2016/0029562 | A1 | 2/2016 | De Smet | |
| 2017/0196169 | A1 | 7/2017 | Duquesne | |
| 2017/0311547 | A1* | 11/2017 | Fuchs | A01F 12/446 |

(Continued)

FOREIGN PATENT DOCUMENTS

| | | | |
|---|---|---|---|
| EP | 1595435 | A1 | 11/2005 |
| EP | 1712122 | A1 | 10/2006 |

(Continued)

OTHER PUBLICATIONS

Extended European Search Report for EP Application No. 23159657.8 dated Aug. 3, 2023 (11 pages).

*Primary Examiner* — Brad Harcourt

(74) *Attorney, Agent, or Firm* — Foley & Lardner LLP

(57) ABSTRACT

A combine harvester comprises a threshing system and a cleaning system. The cleaning system comprises a crop flow sensing system configured to monitor a lateral distribution of crop on the cleaning system. The threshing system comprises a return pan configured to guide the threshed and separated grain in a forward direction towards the cleaning system. The combine harvester further comprises a hillside compensation system, configured to control the cleaning system in order to adjust the lateral distribution of crop on the cleaning system. The hillside compensation system is further configured to control the return pan separately from the cleaning system and depending on the lateral distribution of crop on the cleaning system.

14 Claims, 1 Drawing Sheet

(56) References Cited

U.S. PATENT DOCUMENTS

| | | | | |
|---|---|---|---|---|
| 2018/0279557 | A1 | 10/2018 | Duquesne | |
| 2020/0281118 | A1 | 9/2020 | Garrett | |
| 2020/0390033 | A1* | 12/2020 | Thomas | A01F 12/446 |
| 2020/0396899 | A1* | 12/2020 | Koch | A01D 41/1276 |
| 2023/0015715 | A1 | 1/2023 | Andersen | |
| 2023/0058693 | A1* | 2/2023 | Ohms | A01D 41/1273 |
| 2023/0099523 | A1* | 3/2023 | Baumgarten | A01D 41/127 460/5 |

FOREIGN PATENT DOCUMENTS

| | | | |
|---|---|---|---|
| EP | 2537404 | A1 | 12/2012 |
| EP | 3782455 | A1 | 2/2021 |

* cited by examiner

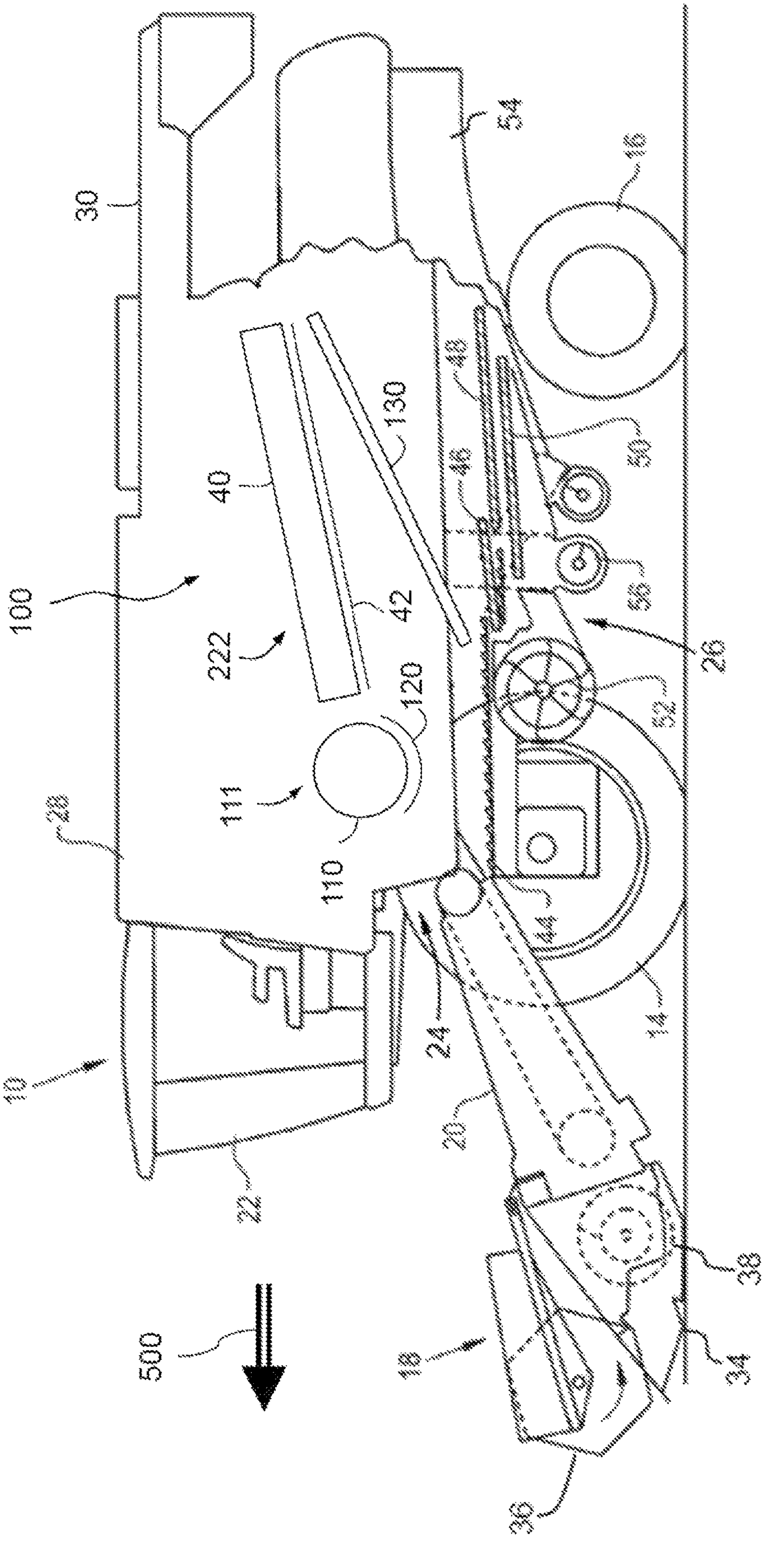
30
54
16
48
130
50
40
46
56
100
42
222
26
120
52
111
28
110
44
14
24
10
20
22
38
500
18
34
36

RETURN PAN CONTROL IN A COMBINE HARVESTER

TECHNICAL FIELD

The present invention relates to a combine harvester comprising a threshing system and a cleaning system. The threshing system is provided for threshing and separating grain from a harvested grain crop, the cleaning system for receiving the threshed and separated grain from the threshing system and for removing chaff from the received grain. The threshing system comprises a return pan configured to guide the threshed and separated grain in a forward direction towards the cleaning system, and a grain distribution device for adjusting a lateral distribution of the threshed and separated grain on the return pan before it reaches the cleaning system. The present invention further relates to a method and a computer program product for adjusting a lateral distribution of threshed and separated grain on a return pan of a threshing system of a combine harvester.

BACKGROUND

Combine harvesters, also simply called combines, are complex driving agricultural machinery comprising a variety of mechanical tools for reaping grain crops from a field, feeding the reaped crop into the crop processing core of the combine, threshing the grain, and separating the threshed grain from the straw and other non-grain material. In most combine harvester a cleaning system is provided for blowing the chaff off the separated grain kernels and the cleaned grain is then transported to a clean grain tank wherein the grain is temporarily stored until the grain tank is unloaded into a trailer or at a grain storage facility.

During harvesting, the harvested crop enters the combine harvester at the front of the vehicle and moves rearward through the threshing and cleaning systems while being processed. In many combine harvesters, the threshing and separation section (often just called the threshing system) comprises a long longitudinally arranged threshing rotor that extends at least partly over the cleaning system. To effectively use the full length of the cleaning system, the threshing system may further comprise a return pan that is installed below the threshing rotor and inclined to allow the threshed grain to flow back towards the front end of the cleaning system.

In, for example, the international patent application published as WO 2017/040252 A1, a return pan is placed under a rear section of the threshing rotor. During operation, the return pan shakes in the fore-to-aft direction. A combination of gravity and this shaking motion makes the crop material return to a grain pan at the front end of the cleaning system. The return pan is further configured to shake in the lateral direction to compensate for lateral inclinations in the field and to promote a more symmetric lateral distribution of crop material on the return pan. The lateral shake of the return pan is directly linked to a lateral shake of the grain pan and sieves of the cleaning system. In EP 3 238 527 A1 and WO 2022/023834 A1 return pans with adjustable paddles are disclosed. Grain distribution sensors on the return pans are used to control an orientation of the paddles in such a way that a more even distribution of the grain on the return pan is obtained.

Although such known solutions may help to improve the efficiency of the cleaning system, further improvements are desired.

SUMMARY OF THE INVENTION

According to an aspect of the invention there is provided a combine harvester comprising a threshing system for threshing and separating grain from a harvested grain crop, and a cleaning system, configured to receive the threshed and separated grain from the threshing system, and to remove chaff from the received grain. The cleaning system comprises a crop flow sensing system configured to monitor a lateral distribution of crop on the cleaning system. The threshing system comprises a return pan configured to guide the threshed and separated grain in a forward direction towards the cleaning system. The combine harvester further comprises a hillside compensation system, configured to control the cleaning system in order to adjust the lateral distribution of crop on the cleaning system. The hillside compensation system is configured to control the return pan separately from the cleaning system and in dependence of the lateral distribution of crop on the cleaning system.

By applying separate hillside compensation adjustments to the return pan and the cleaning system, a more precise and efficient control of the lateral distribution of grain on the cleaning system is made possible. Instead of attempting to maximally level the grain mass on both the return pan and the cleaning system by a single control measure, for example by adding a common side-shake component to the fore-aft reciprocal movement of both, alternative, less complex, and more effective hillside compensation measures are now made available. For example, smaller grain distribution asymmetries on the cleaning system may be compensated by adjusting the return pan operation in a way that provides a complementary asymmetric distribution of grain on the return pan. With the independent control of the return pan hillside compensation measures, just based on the later crop distribution on the cleaning system a more responsive and more accurate hillside compensation system is thus obtained.

In an embodiment of the invention, the threshing system comprises a return pan side-shake module configured to reciprocatingly move the return pan in an at least partially lateral direction, and the hillside compensation system is configured to control the return pan side-shake module separately from the cleaning system and in dependence of the lateral distribution of crop on the cleaning system. While the use of side-shake for the return pan is known from, e.g., WO 2017/040252 A1, such known return pan side-shake systems are directly linked to and operated jointly with side-shake systems for the sieves of the cleaning system. According to embodiments of the invention, the cleaning system may comprise at least one cleaning sieve and a cleaning sieve side-shake module configured to reciprocatingly move the cleaning sieve in an at least partially lateral direction. However, even in such embodiments, the hillside compensation system is now configured to separately control the cleaning sieve side-shake module and the return pan side-shake module. Consequently, a more responsive and more accurate hillside compensation system is obtained.

The hillside compensation system may, for example, be configured to adjust a side shake frequency of the return pan side-shake module independently of a side shake frequency of the cleaning sieve side-shake module. Additionally or alternatively, the hillside compensation system may be configured to adjust a side shake amplitude of the return pan side-shake module independently of a side shake amplitude of the cleaning sieve side-shake module. Furthermore, the hillside compensation system may be configured to adjust a side shake phase angle of the cleaning sieve side-shake module relative to a side shake phase angle of the return pan side-shake module. When, for example, both side shake modules operate at the same side-shake frequency, some independent variation of the return pan side-shake amplitude or phase angle relative to the cleaning sieve side-shake may improve the lateral crop distribution on the cleaning system and the overall efficiency of the grain cleaning process.

In some embodiments, the threshing system may comprise at least one adjustable vane, provided on an upper surface of the return pan. The hillside compensation system may then be configured to adjust an orientation of the adjustable vane for controlling a flow direction of the threshed and separated grain that is guided towards the cleaning system. While return pans with adjustable vanes or paddles may already been known from, e.g., EP 3 238 527 A1 and WO 2022/023834 A1, those prior art paddles are operated in dependence of the lateral crop distribution on the return pan itself only. The inventors have found that this known approach may often lead to unsatisfactory results when the lateral crop distribution on the cleaning system is uneven too.

In embodiments of the invention, the cleaning system comprises a preparation pan and the crop flow sensing system is configured to monitor a crop layer thickness in at least two different lateral positions on the preparation pan. Typically, the return pan delivers the threshed grain to cleaning system by dropping it onto a downstream portion of the preparation pan. When comparing the crop layer thickness in two or more different lateral positions on the preparation pan, an asymmetry in the lateral crop distribution can be detected and the hillside compensation system may be instructed to deliver more threshed grain to that part of the preparation pan with a lower amount of crop on it. As a result, the threshed grain that is later dropped from the preparation pan onto the cleaning sieves will be more evenly distributed over the full width of the cleaning system.

As an example, the crop flow sensing system may comprise at least two pressure sensors for monitoring a pressure difference between at least two different lateral positions under a cleaning sieve of the cleaning system. A layer of crop lying on top of the sieves partially blocks the air blown through the sieve for separating the lighter chaff from the heavier grain kernels. This airflow resistance caused by the crop layer leads to an elevated air pressure underneath the cleaning sieve. A locally thicker layer of crop results in increased airflow resistance and thus a local increase of pressure. When installing multiple air pressure sensors in different lateral positions underneath the sieve, the lateral distribution of crop on the cleaning system can be accurately determined in real time. Adjustments of the operation of the return pan by the hillside compensation system are then used to obtain and maintain a more even lateral distribution.

According to a further example, the crop flow sensing system may comprise at least two grain loss sensors, installed in at least two different lateral positions behind the cleaning system. Such grain loss sensors may, for example, be provided as knock sensors that can be used for counting grain kernels falling from the cleaning system onto the grain loss sensors. If a first side of the cleaning system shows higher grain losses than a second side, this may indicate that the first side of the cleaning system is receiving larger amounts of threshed grain and has more trouble processing it all efficiently. To solve such issues and balance the load on the cleaning system, the hillside compensation system may be used to control the return pan in such a way that more threshed grain goes to the second side of the cleaning system and less to the first side.

In some embodiments, the hillside compensation system may comprise a levelling system for adjusting an orientation of the cleaning system relative to the threshing system. Preferably, the cleaning system is pivotable about a pivot axis that lies within a vertical plane that is substantially parallel to a driving direction of the combine harvester and the levelling system is configured to pivot the cleaning system about the pivot axis. The levelling system may be configured to pivot the complete cleaning system, i.e., the preparation pan, all cleaning sieves, and the cleaning fan together or individually. Alternatively, the levelling system may, e.g., be configured to just pivot on or more of the cleaning sieves. The levelling system may be actively controlled using one or more actuators, or the cleaning system may be self-levelling, e.g. by means of some gyroscopic arrangement. In a particularly effective embodiment of the invention, the cleaning system levelling system provides for a base level of hillside compensation and any remaining asymmetries in the lateral crop distribution on the cleaning system are then eliminated by adjusting the operation of the return pan.

According to a further aspect of the invention, a method is provided for adjusting a lateral distribution of threshed and separated grain on a return pan of a threshing system of a combine harvester. The method comprises steps of

- receiving, from a crop flow sensing system of a cleaning system of the combine harvester, a distribution signal representative of a lateral distribution of crop on the cleaning system,
- controlling the cleaning system in order to adjust the lateral distribution of crop on the cleaning system, and
- based on the distribution signal, controlling an operation of a return pan of the threshing system separately from the cleaning system.

BRIEF DESCRIPTION OF THE DRAWINGS

Embodiments of the invention will now be described by way of example with reference to the accompanying drawings, in which:

FIG. 1 schematically shows an embodiment of a combine harvester according to an embodiment of the invention.

DETAILED DESCRIPTION

FIG. 1 schematically shows an agricultural harvester in the form of a combine harvester 10. The combine harvester 10 generally includes front and rear round engaging wheels 14, 16, a header 18, a feeder 20, an operator cabin 22, a threshing and separation system 24, a cleaning system 26, a grain tank 28 and an unloading tube 30.

A header 18 is mounted to the front of the combine harvester 10 and includes a cutter bar 34 for severing crops from a field during forward motion 500 of the combine. A rotatable reel 36 feeds the crop into the header 18, and a double auger 38 feeds the severed crop laterally from each side towards the feeder 20. The feeder 20 conveys the severed crop to the threshing and separation system 24.

The threshing and separation system 24 of the combine harvester 10 shown here is of the hybrid type with a transverse threshing stage 111 and an axial-flow type threshing stage 222. The transverse threshing stage 111 comprises a transverse threshing drum 110 arranged above and in parallel with a transverse threshing concave 120. The incoming crop coming from the feeder 20 is partly threshed between the transverse threshing drum 110 and the transverse threshing concave 120. The threshed grain that falls through the transverse concave 120 falls on a preparation pan 44 of the cleaning system 26. The non-threshed crop and loose grain kernels that are still caught up in the large crop mass are passed on to the axial-flow type threshing stage 222.

The axial-flow type threshing stage 222 comprises an axial threshing rotor 40 that is at least partially located and rotatable within an axial threshing concave 42. The axial threshing concave may 42 take the form of a perforated concave. Grain from the severed crop is threshed and separated from the material other than grain (MOG) by the action of the axial threshing rotor 40 within the axial threshing concave 42. Larger elements of MOG, such as stalks and leaves do not pass through the perforations in the axial threshing concave 42 and are discharged from the rear of the combine harvester 10. Grain and smaller elements of MOG (small MOG henceforth), such as chaff, dust and straw are small enough to pass through the perforations in the axial threshing concave 42 and fall through the axial threshing concave 42, onto a return pan 130.

The return pan 130 that is installed below the axial threshing rotor 42 is inclined to allow the threshed grain and MOG to flow back towards the front end of the cleaning system 26. During operation, the return pan 130 shakes in the fore-to-aft direction. A combination of gravity and this shaking motion makes the grain and MOG move to the front end of the return pan 130 from where it is dropped onto the downstream end of the preparation pan 44. Alternatively, the preparation pan 130 may be arranged to drop the grain and MOG directly onto one of the sieves 46, 48 of the cleaning system 26.

The cleaning system 26 comprises a series of sieves 46, 48, 50 and a cleaning fan 52. The series of sieves 46, 48, 50 includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

While the invention will now be explained with reference to the above describe exemplary combine harvester 10, it is to be noted that the invention is not limited to this particular embodiment. For example, the threshing system 24 and the cleaning system 26 may be set up differently. The threshing system 24 may, for example, comprise only transverse threshing drums or only one or more axial threshing rotors. The cleaning system 26 may comprise a different number of sieves. Other suitable variations will be apparent to the skilled person.

In embodiments of the invention, the cleaning system 26 comprises a crop flow sensing system configured to monitor a lateral distribution of crop on the cleaning system. As an example, the crop flow sensing system may comprise at least two pressure sensors for monitoring a pressure difference between at least two different lateral positions under one or more of the cleaning sieves 46, 48, 50 of the cleaning system. A layer of crop lying on top of the sieves 46, 48, 50 partially blocks the air blown through the sieves 46, 48, 50 by the fan 52 for separating the lighter chaff from the heavier grain kernels. This airflow resistance caused by the crop layer leads to an elevated air pressure underneath the cleaning sieves 46, 48, 50. A locally thicker layer of crop results in increased airflow resistance and thus a local increase of pressure. When installing multiple air pressure sensors in different lateral positions underneath one or more of the sieves 46, 48, 50, the lateral distribution of crop on the cleaning system 26 can be accurately determined in real time. Adjustments of the operation of the return pan 130 by a hillside compensation system as will be described in more detail below are then used to obtain and maintain a more even lateral distribution.

As an alternative of, or in addition to the pressure sensors, the crop flow sensor system may use two or more crop layer thickness sensors, installed at different lateral locations on one or more of the sieves 46, 48, 50.

The crop flow sensing system may further comprise at least two grain loss sensors, installed in at least two different lateral positions behind the cleaning system 26, typically behind the top sieve 48. Such grain loss sensors may, for example, be provided as knock sensors that can be used for counting grain kernels falling from the cleaning system 26 onto the grain loss sensors. If a first side of the cleaning system 26 shows higher grain losses than a second side, this may indicate that the first side of the cleaning system 26 is receiving larger amounts of threshed grain and has more trouble processing it all efficiently. To solve such issues and balance the load on the cleaning system 26, the hillside compensation system may be used to control the return pan 130 in such a way that more threshed grain goes to the second side of the cleaning system and less to the first side. The crop layer thickness on the sieves 46, 48, 50 may, for example, be measured using contact sensors or optical sensors as are well known in the art.

In embodiments of the invention, the crop flow sensing system may be configured to monitor a crop layer thickness in at least two different lateral positions on the preparation pan 44. Typically, as shown in FIG. 1, the return pan 44 delivers the threshed grain to cleaning system 26 by dropping it onto a downstream portion of the preparation pan 44. When comparing the crop layer thickness in two or more different lateral positions on the preparation pan 44, an asymmetry in the lateral crop distribution can be detected and the hillside compensation system may be instructed to adjust the return pan operation in such a way to deliver more threshed grain to that part of the preparation pan 44 with a lower amount of crop on it. As a result, the threshed grain that is later dropped from the preparation pan 44 onto the cleaning sieves 46, 48, 50 will be more evenly distributed over the full width of the cleaning system 26. The crop layer thickness on the preparation pan 44 may, for example, be measured using contact sensors or optical sensors.

The hillside compensation system is configured to control the cleaning system 26 in order to adjust the lateral distribution of crop on the cleaning system 26. The hillside compensation system is further configured to control the return pan 130 separately from the cleaning system 26 and in dependence of the lateral distribution of crop on the cleaning system 26. By applying separate hillside compensation adjustments to the return pan 130 and the cleaning system 26, a more precise and efficient control of the lateral distribution of grain on the cleaning system 26 is made possible. Instead of attempting to maximally level the grain mass on both the return pan 130 and the cleaning system 26 by a single control measure, for example by adding a common side-shake component to the fore-aft reciprocal movement of both, alternative, less complex, and more effective hillside compensation measures are now made available. For example, smaller grain distribution asymmetries on the cleaning system 26 may be compensated by adjusting the return pan operation in a way that provides a complementary asymmetric distribution of grain on the return pan 130. With the independent control of the return pan hillside compensation measures, just based on the later crop distribution on the cleaning system 26 a more responsive and more accurate hillside compensation system is thus obtained.

In an embodiment of the invention, the threshing system 24 comprises a return pan side-shake module configured to reciprocatingly move the return pan 130 in an at least partially lateral direction, and the hillside compensation system is configured to control the return pan side-shake module separately from the cleaning system 26 and in dependence of the lateral distribution of crop on the cleaning system 26. According to embodiments of the invention, the cleaning system 26 may comprise at least one cleaning sieve 46, 48, 50 and a cleaning sieve side-shake module. The cleaning sieve side-shake module configured to reciprocatingly move the cleaning sieves 46, 48, 50 in an at least partially lateral direction. However, even in such embodiments, the hillside compensation system is now configured to separately control the cleaning sieve side-shake module and the return pan side-shake module. Consequently, a more responsive and more accurate hillside compensation system is obtained.

The hillside compensation system may, for example, be configured to adjust a side shake frequency of the return pan side-shake module independently of a side shake frequency of the cleaning sieve side-shake module. Additionally or alternatively, the hillside compensation system may be configured to adjust a side shake amplitude of the return pan side-shake module independently of a side shake amplitude of the cleaning sieve side-shake module. Furthermore, the hillside compensation system may be configured to adjust a side shake phase angle of the cleaning sieve side-shake module relative to a side shake phase angle of the return pan side-shake module. When, for example, both side shake modules operate at the same side-shake frequency, some independent variation of the return pan side-shake amplitude or phase angle relative to the cleaning sieve side-shake may improve the lateral crop distribution on the cleaning system and the overall efficiency of the grain cleaning process.

In some embodiments, the threshing system 24 may comprise at least one adjustable vane, provided on an upper surface of the return pan 130. The hillside compensation system may then be configured to adjust an orientation of the adjustable vane for controlling a flow direction of the threshed and separated grain that is guided towards the cleaning system 26. While return pans with adjustable vanes or paddles may have been used before, such prior art paddles are operated in dependence of the lateral crop distribution on the return pan 130 itself only. The inventors have found that this known approach may often lead to unsatisfactory results when the lateral crop distribution on the cleaning system 26 is uneven too.

In some embodiments, the hillside compensation system may comprise a levelling system for adjusting an orientation of the cleaning system 26 relative to the threshing system 24. Preferably, the cleaning system 26 is pivotable about a pivot axis that lies within a vertical plane that is substantially parallel to a driving direction 500 of the combine harvester 10 and the levelling system is configured to pivot the cleaning system 26 about the pivot axis. The levelling system maybe configured to pivot the complete cleaning system, i.e., the preparation pan 44, all cleaning sieves 46, 48, 50, and the cleaning fan 52 together or individually. Alternatively, the levelling system may, e.g., be configured to just pivot on or more of the cleaning sieves 46, 48, 50. The levelling system may be actively controlled using one or more actuators, or the cleaning system 26 may be self-levelling, e.g. by means of some gyroscopic arrangement. In a particularly effective embodiment of the invention, the cleaning system levelling system provides for a base level of hillside compensation and any remaining asymmetries in the lateral crop distribution on the cleaning system 26 are then eliminated by adjusting the operation of the return pan 130.

The invention claimed is:

1. A combine harvester comprising a threshing system for threshing and separating grain from a harvested grain crop;

a cleaning system configured to receive the threshed and separated grain from the threshing system, and to remove chaff from the received grain, the cleaning system comprising a crop flow sensing system configured to monitor a lateral distribution of crop on the cleaning system; and a hillside compensation system configured to control the cleaning system in order to adjust the lateral distribution of crop on the cleaning system, wherein the threshing system comprises a return pan configured to guide the threshed and separated grain in a forward direction towards the cleaning system, and wherein the hillside compensation system is configured to control the return pan separately from the cleaning system and depending on the lateral distribution of crop on the cleaning system.

2. The combine harvester of claim 1, wherein the threshing system comprises a return pan side-shake module configured to reciprocatingly move the return pan in an at least partially lateral direction, and wherein the hillside compensation system is further configured to control the return pan side-shake module separately from the cleaning system and depending on the lateral distribution of crop on the cleaning system.

3. The combine harvester of claim 2, wherein the cleaning system further comprises at least one cleaning sieve, and a cleaning sieve side-shake module configured to reciprocatingly move the cleaning sieve in an at least partially lateral direction, and wherein the hillside compensation system is further configured to separately control the cleaning sieve side-shake module and the return pan side-shake module.

4. The combine harvester of claim 3, wherein the hillside compensation system is further configured to adjust a side shake frequency of the return pan side-shake module independently of a side shake frequency of the cleaning sieve side-shake module.

5. The combine harvester of claim 3, wherein the hillside compensation system is further configured to adjust a side shake amplitude of the return pan side-shake module independently of a side shake amplitude of the cleaning sieve side-shake module.

6. The combine harvester of claim 3, wherein the hillside compensation system is further configured to adjust a side shake phase angle of the cleaning sieve side-shake module relative to a side shake phase angle of the return pan side-shake module.

7. The combine harvester of claim 3, wherein the crop flow sensing system comprises at least two pressure sensors for monitoring a pressure difference between at least two different lateral positions under the cleaning sieve.

8. The combine harvester of claim 1, wherein the threshing system further comprises at least one adjustable vane, provided on an upper surface of the return pan, and wherein the hillside compensation system is further configured to adjust an orientation of the adjustable vane for controlling a flow direction of the threshed and separated grain that is guided towards the cleaning system.

9. The combine harvester of claim 1, wherein the cleaning system further comprises a preparation pan, and wherein the crop flow sensing system is further configured to monitor a crop layer thickness in at least two different lateral positions on the preparation pan.

10. The combine harvester of claim 1, wherein the crop flow sensing system comprises at least two grain loss sensors, installed in at least two different lateral positions behind the cleaning system.

11. The combine harvester of claim 1, wherein the hillside compensation system comprises a levelling system for adjusting an orientation of the cleaning system relative to the threshing system.

12. The combine harvester of claim 11, wherein the cleaning system is pivotable about a pivot axis that lies within a vertical plane that is substantially parallel to a driving direction of the combine harvester and wherein the levelling system is configured to pivot the cleaning system about the pivot axis.

13. A method of adjusting a lateral distribution of threshed and separated grain on a return pan of a threshing system of a combine harvester, the method comprising receiving, from a crop flow sensing system of a cleaning system of the combine harvester, a distribution signal representative of the lateral distribution of crop on the cleaning system, controlling the cleaning system in order to adjust the lateral distribution of crop on the cleaning system, and based on the distribution signal, controlling an operation of a return pan of the threshing system separately from the cleaning system.

14. A non-transitory, computer-readable storage medium storing instructions thereon that when executed by one or more processors cause the one or more processors to execute the method of claim 13.

* * * * *